(12) United States Patent
Li et al.

(10) Patent No.: US 10,732,448 B2
(45) Date of Patent: Aug. 4, 2020

(54) DISPLAY PANEL AND DISPLAY DEVICE

(71) Applicant: BOE Technology Group Co., Ltd., Beijing (CN)

(72) Inventors: Zhongxiao Li, Beijing (CN); Xue Dong, Beijing (CN); Xiaochuan Chen, Beijing (CN); Wenqing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 78 days.

(21) Appl. No.: 16/021,620

(22) Filed: Jun. 28, 2018

(65) Prior Publication Data
US 2019/0121192 A1 Apr. 25, 2019

(30) Foreign Application Priority Data
Oct. 23, 2017 (CN) .......................... 2017 1 0993439

(51) Int. Cl.
*G02F 1/1335* (2006.01)
*G02F 1/1343* (2006.01)
*G02F 1/29* (2006.01)
*G02F 1/1333* (2006.01)

(52) U.S. Cl.
CPC .. *G02F 1/133512* (2013.01); *G02F 1/133514* (2013.01); *G02F 1/133528* (2013.01); *G02F 1/134309* (2013.01); *G02F 1/29* (2013.01); *G02F 2001/133357* (2013.01); *G02F 2201/121* (2013.01); *G02F 2201/123* (2013.01)

(58) Field of Classification Search
CPC ......... G02F 1/133512; G02F 1/133514; G02F 1/133528; G02F 1/134309; G02F 1/29; G02F 2001/133357; G02F 2201/121; G02F 2201/123
USPC .................................................. 349/110–111
See application file for complete search history.

(56) References Cited

U.S. PATENT DOCUMENTS

2016/0299399 A1\* 10/2016 Kitani ............... G02F 1/136286
2017/0285423 A1\* 10/2017 Kita ..................... G02F 1/1368

\* cited by examiner

*Primary Examiner* — Charles S Chang
(74) *Attorney, Agent, or Firm* — McDermott Will & Emery LLP

(57) ABSTRACT

Provided a display panel and a display device, the display panel includes a first substrate, a second substrate opposite to the first substrate, a first light-shielding pattern, a second light-shielding pattern, a first electrode, a second electrode, a liquid crystal layer and a third light-shielding pattern between the two substrates in sequence; the three light-shielding patterns are configured such that light incident on the liquid crystal layer from the first substrate is prevented from exiting from the second substrate in response to an absence of voltage between the two electrodes; the two electrodes and the liquid crystal layer are configured such that the liquid crystal layer serves as an equivalent grating, and a portion of the light incident on the liquid crystal layer from the first substrate is directed to exit from the second substrate in response to the voltage between the two electrodes.

17 Claims, 8 Drawing Sheets

DISPLAY PANEL AND DISPLAY DEVICE

CROSS-REFERENCE TO RELATED APPLICATION

This application claims priority to Chinese Patent Application No. 201710993439.2 filed on Oct. 23, 2017 in the State Intellectual Property Office of China, the disclosure of which is hereby incorporated by reference in its entirety.

TECHNICAL FIELD

The present disclosure relates to the field of display technology, more particularly, to a display panel and a display device.

DESCRIPTION OF THE RELATED ART

A liquid crystal display is a display device that is widely used at present, it has a series of advantages such as high color gamut, light weight and small thickness, and fast response, and it has relatively developed technologies in theoretical research and practical process.

The basic display principle of the liquid crystal display is: using a liquid crystal material to modulate a polarization state of polarized light to realize display. Generally, it is necessary for a liquid crystal display panel to provide with two polarizers on upper and lower sides of a display panel respectively. Liquid crystal material changes the polarization state of the light, so that some polarized light may be emitted and some polarized light may not be emitted.

However, the use of the polarizer increases cost of a display device on one hand, and reduces reliability of the display device on the other hand.

SUMMARY

An embodiment of the present disclosure provides a display panel, comprising: a first substrate; a second substrate opposite to the first substrate; a liquid crystal layer between the first substrate and the second substrate; a first light-shielding pattern between the first substrate and the liquid crystal layer; a second light-shielding pattern between the first light-shielding pattern and the liquid crystal layer; a third light-shielding pattern between the liquid crystal layer and the second substrate; and a first electrode and a second electrode between the second light-shielding pattern and the liquid crystal layer, wherein the first to third light-shielding patterns are configured such that light incident on the liquid crystal layer from a side of the first substrate away from the second substrate is prevented from exiting from a side of the second substrate away from the first substrate in response to an absence of voltage between the first electrode and the second electrode; and wherein the first electrode, the second electrode and the liquid crystal layer are configured such that the liquid crystal layer serves as an equivalent grating, and a portion of the light incident on the liquid crystal layer from the side of the first substrate away from the second substrate is directed to exit from the side of the second substrate away from the first substrate in response to the voltage between the first electrode and the second electrode.

In some embodiments, the first light-shielding pattern comprises a plurality of first light-shielding strips evenly spaced apart in a first direction, the second light-shielding pattern comprises a plurality of second light-shielding strips evenly spaced apart in the first direction, the third light-shielding pattern comprises a plurality of third light-shielding strips evenly spaced apart in the first direction, an orthogonal projection of a second interval between each two adjacent second light-shielding strips on the first substrate falls within an orthogonal projection of one of the plurality of first light-shielding strips on the first substrate.

In some embodiments, a portion of the light incident from the side of the first substrate away from the second substrate passes through first intervals between two adjacent first light-shielding strips and second intervals between two adjacent second light-shielding strips and reaches the liquid crystal layer, wherein the first to third light-shielding patterns are configured such that the liquid crystal layer serves as an equivalent dielectric layer, and the light reaching and passing through the liquid crystal layer is blocked by the plurality of third light-shielding strips or totally reflected at an interface between the second substrate and an external environment after passing through third intervals between two adjacent third light-shielding strips, in response to the absence of voltage between the first electrode and the second electrode; and wherein the first electrode, the second electrode and the liquid crystal layer are configured such that the liquid crystal layer serves as an equivalent grating, and the light incident on the liquid crystal layer with a polarization direction parallel to the first direction is dispersed into a fan-like light beam after passing through the liquid crystal layer, in response to the voltage between the first electrode and the second electrode, and a portion of the fan-like light beam is directed to pass through the third intervals between the two adjacent third light-shielding strips and emitted from the second substrate, and an intensity of the light emitted from the second substrate is positively correlated to a magnitude of the voltage.

In some embodiments, orthogonal projections of the plurality of first light-shielding strips on the first substrate are coincident with orthogonal projections of the plurality of third light-shielding strips on the first substrate, respectively.

In some embodiments, a width of each of the second light-shielding strips is approximately a half of a width of each of the first light-shielding strips.

In some embodiments, an orthogonal projection of at least one of the second light-shielding strips on the first substrate and an orthogonal projection of at least one of the first light-shielding strips adjacent to the at least one of the second light-shielding strips on the first substrate have an overlapping region.

In some embodiments, an orthogonal projection of at least one of the second light-shielding strips on the first substrate and an orthogonal projection of at least one of the third light-shielding strips adjacent to the at least one of the second light-shielding strips on the first substrate have an overlapping region.

In some embodiments, the second electrode is between the first electrode and the liquid crystal layer, and the second electrode comprises a plurality of second sub-electrodes evenly spaced apart in the first direction.

In some embodiments, the second electrode is periodic with a pitch of approximately 3 µm-10 µm.

In some embodiments, the first electrode is a planar electrode.

In some embodiments, the first electrode comprises a plurality of first sub-electrodes evenly spaced apart in the first direction, orthogonal projections of the plurality of first sub-electrodes on the first substrate and orthogonal projections of the plurality of second sub-electrodes on the first substrate are alternately arranged one by one.

In some embodiments, the grating is of a periodic arch structure.

In some embodiments, a pitch of the grating is half of a pitch of the second electrode.

In some embodiments, a width of the second interval between each two adjacent second light-shielding strips is approximately 20 μm to 30 μm.

In some embodiments, the display panel comprising: a plurality of color filter layers respectively disposed between each two adjacent third light-shielding strips and disposed in a same layer as the third light-shielding strips.

In some embodiments, the display panel comprising: a resin layer between the first light-shielding pattern and the second light-shielding pattern; a planarization layer between the second light-shielding pattern and the first electrode; and an insulating layer between the first electrode and the second electrode.

An embodiment of the present disclosure provides a display device comprising: the display panel of any one of the above embodiments; and a backlight source facing the first substrate.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION OF THE EMBODIMENTS

Figure 1:
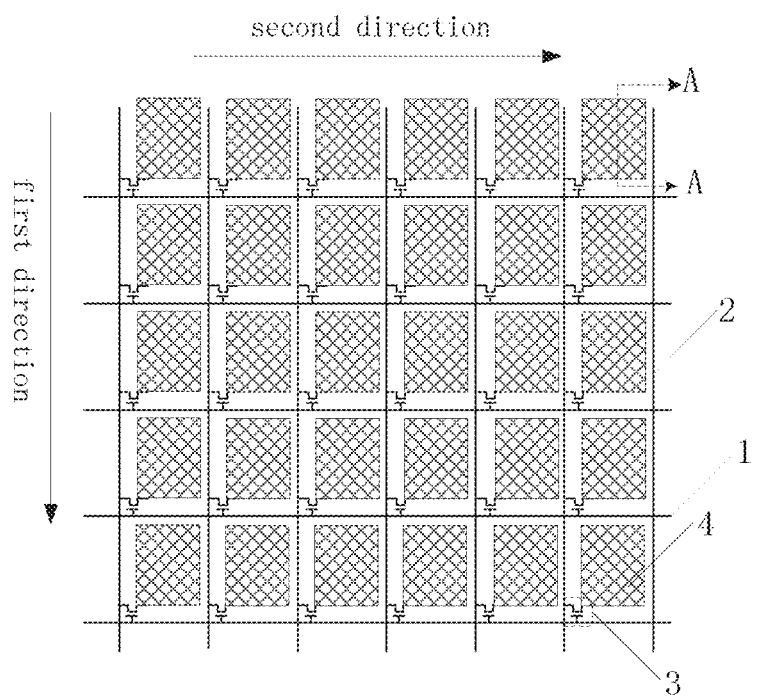
FIG. 1 is a schematic top view of a display panel provided by an embodiment of the present disclosure.

To make the above objectives, features, and advantages of the present disclosure more apparent and easier to be understood, the present disclosure will be further described below with reference to the accompanying drawings and embodiments. However, exemplary embodiments can be implemented in various forms and should not be construed as limitation to the embodiments set forth herein; rather, these embodiments are provided so that the description of this disclosure will be more comprehensive and complete, and the concept of the exemplary embodiments will be fully conveyed to those skilled in the art. The same reference numerals in the drawings denote the same or similar structures, and thus their repeated description will be omitted. The expressions of the positions and directions described in this disclosure are incorporated with reference to the drawings as an example, but changes may be made as needed, and the changes are all included in the scope of the disclosure. The drawings of the present disclosure are only used for illustrating the relative positional relationship, and the layer thicknesses of some parts are illustrated in a magnification manner so as to facilitate understanding the present disclosure. The layer thicknesses in the drawings do not represent the real scale of the actual layer thickness.

It should be noted that specific details are set forth in the following description in order to fully understand the present disclosure. However, the present disclosure can be implemented in a variety of other manners different from those described herein, and those skilled in the art can make similar extensions without departing from the content of the present disclosure. Therefore, the present disclosure is not limited by the specific embodiments disclosed below. Certain terms are used to refer to particular components throughout the specification and claims. Those skilled in the art will understand that hardware manufacturers may use different terms to refer to the same component. Different components are distinguished in the specification and the claims by using functions of the components as the criteria for differentiation, instead of their names. As used throughout the specification and claims, "comprise/comprising" is an open-ended term and it should be interpreted as "include/including but not limited to". The subsequent description of the specification is intended to embody optional embodiments of the present application. However, the description is intended to illustrate general principles of the present application, instead of limiting the scope of the present application. The scope of this application is defined by the appended claims. It will be understood that when an element such as a layer, film, region, or substrate is defined as being "on" another element, the element can be directly located on the other element, or one or more intervening elements may be intervened therebetween.

An embodiment of the present disclosure provides a display unit, a display panel, and a display device. The display unit realizes display of different gray levels through an arrangement of light-shielding patterns and a liquid crystal layer being equivalent to a grating under the effect of a voltage. In this embodiment, it is unnecessary to provide a polarizer in the display panel, thereby reducing the cost of the display panel and improving the reliability of the display panel.

FIG. 1 is a schematic top view of a display panel provided by an embodiment of the present disclosure. Referring to FIG. 1, the display panel includes a plurality of data lines 2 and a plurality of gate lines 1. The plurality of data lines 2 extend in a first direction, for example, the vertical direction, and the plurality of gate lines 1 extend in a second direction, for example, the horizontal direction. The plurality of gate lines 1 and the plurality of data lines 2 are disposed to cross each other. The plurality of gate lines 1 and the plurality of data lines 2 crossing each other define a plurality of regions, one thin film transistor 3 is provided in each of the plurality of regions. The display panel further includes a plurality of display units 4 arranged in an array. One display unit 4 is provided in each of the plurality of regions. Each thin film transistor 3 is connected to one display unit 4 to control the display unit 4 for display.

Figure 2:
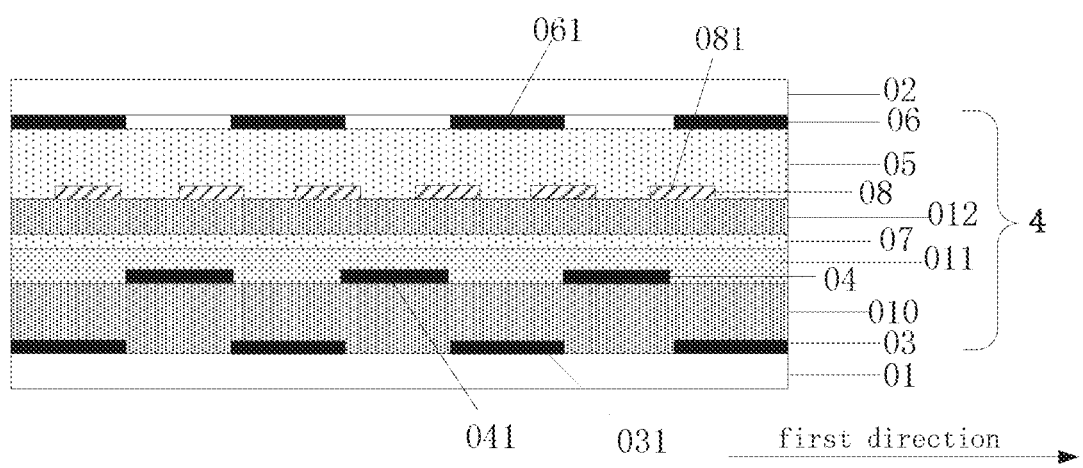
FIG. 2 is a schematic sectional view of a display unit taken along line A-A in FIG. 1.

FIG. 2 is a schematic sectional view of a display unit taken along line A-A in FIG. 1. Referring to FIG. 1 and FIG. 2, the display panel provided in an embodiment of the present disclosure includes a first substrate 01 and a second substrate 02 aligned and assembled with each other. The display panel further includes the display units 4 disposed between the first substrate 01 and the second substrate 02 and arranged in the array. The first substrate 01 and the second substrate 02 may be made of a transparent material, for example, the material of the first substrate 01 and the second substrate 02 is glass.

Referring to FIG. 2, the display unit provided by the embodiment of the present disclosure includes a liquid crystal layer 05, a first light-shielding pattern 03, a second light-shielding pattern 04, a third light-shielding pattern 06, a first electrode 07, and a second electrode 08. The liquid crystal layer 05 is disposed between the first substrate 01 and the second substrate 02 aligned and assembled with each other. The first light-shielding pattern 03 is disposed between the first substrate 01 and the liquid crystal layer 05. The first light-shielding pattern 03 includes a plurality of first light-shielding strips 031 evenly spaced apart in the first direction, and a first interval is provided between each two adjacent first light-shielding strips 031. The plurality of first light-shielding strips 031 extend in the second direction throughout the entire display unit 4. The second light-shielding pattern 04 is disposed between the first light-shielding pattern 03 and the liquid crystal layer 05. The second light-shielding pattern 04 includes a plurality of second light-shielding strips 041 evenly spaced apart in the first direction, and a second interval is provided between each two adjacent second light-shielding strips 041. The plurality of second light-shielding strips 041 extend in the second direction throughout the entire display unit 4. The third light-shielding pattern 06 is disposed between the second substrate 02 and the liquid crystal layer 05. The third light-shielding pattern 06 includes a plurality of third light-shielding strips 061 evenly spaced apart in in the first direction, a third interval is provided between each two adjacent third light-shielding strips 061. The plurality of third light-shielding strips 061 extend in the second direction throughout the display unit 4. An orthogonal projection of the second interval between each two adjacent second light-shielding strips 041 on the first substrate 01 falls within an orthogonal projection of one of the plurality of first light-shielding strips 031 on the first substrate 01.

The first electrode 07 is disposed between the liquid crystal layer 05 and the second light-shielding pattern 04, and the second electrode 08 is disposed between the first electrode 07 and the liquid crystal layer 05. When no voltage is applied between the first electrode 07 and the second electrode 08, no electric field is generated, the liquid crystal layer 05 serves as a dielectric layer for light. At this time, due to the arrangement of the first to third light-shielding patterns, light entering a side of the first substrate 01 facing away from the second substrate may not exit from a side of the second substrate 02 facing away from the first substrate 01. When a voltage is applied between the first electrode 07 and the second electrode 08 to generate an electric field, the liquid crystal layer 05 is equivalent to a grating under an action of the electric field, so that a portion of the light entering the side of the first substrate 01 facing away from the second substrate may exit from the side of the second substrate 02 facing away from the first substrate 01.

Specifically, in the above-mentioned display unit provided by the embodiment of the present disclosure, referring to FIG. 2, it further includes: a resin layer 010, a planarization layer 011, and an insulating layer 012. The resin layer 010 is disposed between the first light-shielding pattern 03 and the second light-shielding pattern 04, and the resin layer 10 fills the plurality of first intervals. The planarization layer 011 is disposed between the second light-shielding pattern 04 and the first electrode 07, and the planarization layer 011 fills the plurality of second intervals. As such, the first electrode 07 is formed on a flat surface, which facilitates the manufacture of the first electrode 07. The insulating layer 012 is disposed between the first electrode 07 and the second electrode 08.

Figure 3:
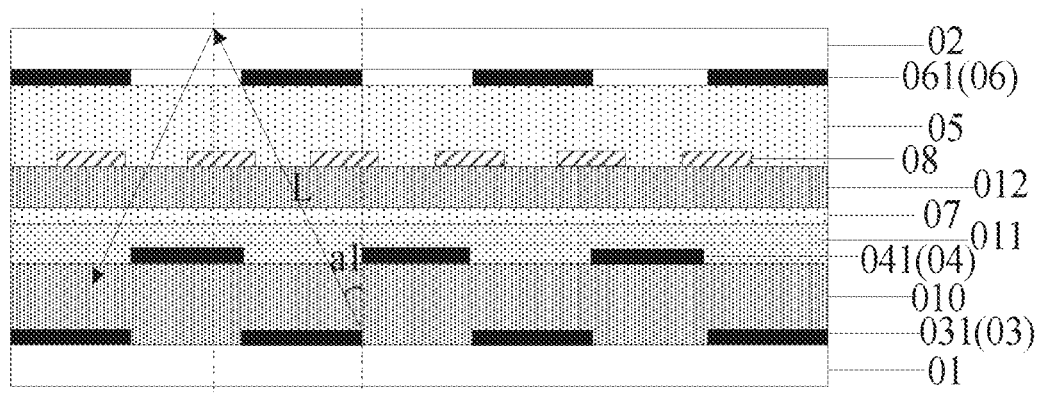
FIG. 3 is a schematic view of a light path of light incident on a liquid crystal layer when no voltage is applied between a first electrode and a second electrode in the display unit of FIG. 2.

The following specifically describes an example in which display is implemented (for example, display of different gray levels of L0-L255 is implemented) by a display unit provided by an embodiment of the present disclosure. FIG. 3 is a schematic view of a light path of light incident on the liquid crystal layer when no voltage is applied between the first electrode and the second electrode in the display unit of FIG. 2. As shown in FIG. 3, when no electric field is provided between the first electrode 07 and the second electrode 08, the liquid crystal layer 05 disposed between the second light-shielding pattern 04 and the third light-shielding pattern 06 is equivalent to a dielectric layer for light. Because of the arrangement of the first light-shielding pattern 03 and the second light-shielding pattern 04, only a portion of the light entering the side of the first substrate 01 facing away from the second substrate may pass through the first intervals between the first light-shielding strips 031 and the second intervals between the first light-shielding strips 041 and reach the liquid crystal layer 05, and the other portion of the light is blocked or absorbed by the first light-shielding strips 031 and/or the second light-shielding strips 041. A portion of the light entering and passing through the liquid crystal layer 05 may reach the third intervals between the third light-shielding strips 061, and the other portion is blocked or absorbed by the third light-shielding strips 061. FIG. 3 shows a path of light L which has the smallest incident angle among the light reaching the third intervals between the third light-shielding strips 061, as shown in FIG. 3, the light L (solid line in FIG. 3) passes through the first interval between the light-shielding strips 031, the second interval between the second light-shielding strips 041 and the liquid crystal layer 05 and reaches the third interval between the third light-shielding strips 061. In order to prevent the light from exiting from the second substrate 02, the light incident on the third intervals between the third light-shielding strips 061 is totally reflected back into the display unit in the present disclosure by applying the principle that the light with a predetermined angle may be total reflected when it is emitted to air from glass. As shown in FIG. 3, a direction perpendicular to the first substrate is taken as a normal direction, a dotted line in FIG. 3 is a normal line, and the solid line acts as the path of light L which has the smallest incident angle among the light reaching the third intervals between the third light-shielding strips 061. When the light is emitted from the glass to an external environment, such as air, a critical angle for total reflection is a. By means of the arrangement of the third light-shielding pattern 06, for example, adjusting a width of each third light-shielding strip 061 and a width of each third interval, the incident angle of the light L which has the smallest incident angle among the light reaching the third intervals between the third light-shielding strips 061 is set to a first angle a1. In order to make the light entering the third intervals between the third light-shielding strips 061 be totally reflected, the first angle a1 is set to be greater than or equal to the critical angle a. At this time, the incident angles of light incident on the third intervals between the third light-shielding strips 061 are all greater than or equal to the critical angle a, and the total reflection occurs at the interface between the glass and the external environment such as air. Therefore, all the light incident from the side of the first substrate 01 facing away from the second substrate 02 may not pass through and exit from the second substrate 02, thereby realizing a full black state, that is, a display with a gray level of L0 is achieved.

Figure 4:
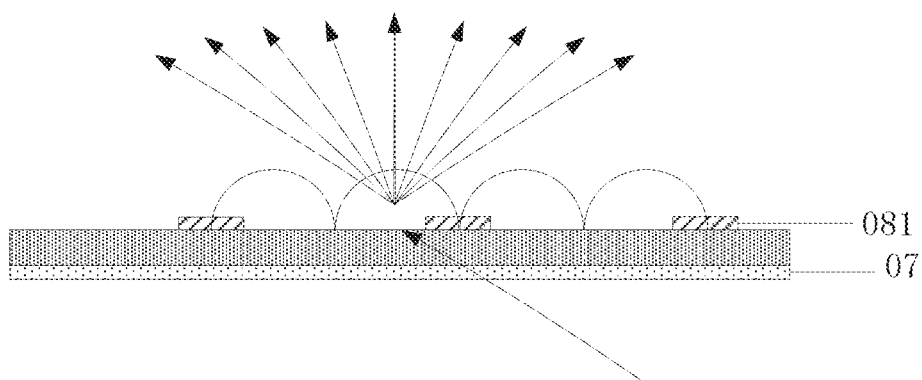
FIG. 4 is a schematic structural view of an equivalent grating corresponding to the liquid crystal layer of FIG. 2 under an action of an electric field.

In this embodiment, as shown in FIG. 2, the first electrode 07 is a planar electrode, and the second electrode 08 includes a plurality of second sub-electrodes 081 that are evenly spaced apart in the first direction, and the plurality of second sub-electrodes 081 extend in the second direction. When the voltage is applied between the first electrode 07 and the second electrode 08, the electric field is generated. Under the effect of the electric field, the liquid crystal layer 05 is equivalent to a grating having a periodic arch structure. FIG. 4 is a schematic structural view of an equivalent grating corresponding to the liquid crystal layer of FIG. 2 under an action of an electric field. As shown in FIG. 4, among the light incident on the liquid crystal layer at any angle, polarized light having a polarization direction parallel to an extending direction of the second sub-electrodes (i.e., the second direction) is dispersed into light diverging in multiple directions by the equivalent grating. In this way, the light incident on the liquid crystal layer in continuous angles is dispersed into the light diverging in multiple directions by the equivalent grating to be combined into a fan-like light beam. The degree to which the light is dispersed is positively related to the voltage applied between the first electrode and the second electrode, the higher the voltage applied between the first electrode and the second electrode is, the greater the degree to which the light is dispersed is. In this case, a portion of the dispersed light passes through the third interval to reach the second substrate. Among the lights reaching the second substrate, the light having an incident angle smaller than the critical angle a may penetrate through the second substrate, thereby realizing display. The equivalent grating does not disperse the polarized light having a polarization direction perpendicular to the extending direction of the second sub-electrodes (i.e., the second direction) among the light incident on the liquid crystal layer at any angle. Thus the polarized light is either blocked or absorbed by the third light-shielding strips, or totally reflected at the interface between the second substrate 02 and the external environment after passing though the liquid crystal layer. That is, the polarized light having a polarization direction perpendicular to the extending direction of the second sub-electrodes (i.e., the second direction) among the light incident on the liquid crystal layer at any angle may not exit form the second substrate. A path of the polarized light having a polarization direction perpendicular to the extending direction of the second sub-electrodes (i.e., the second direction) among the light incident on the liquid crystal layer in the display panel may refer to the aforementioned case where no voltage is applied between the first electrode 07 and the second electrode 08.

Figure 5:
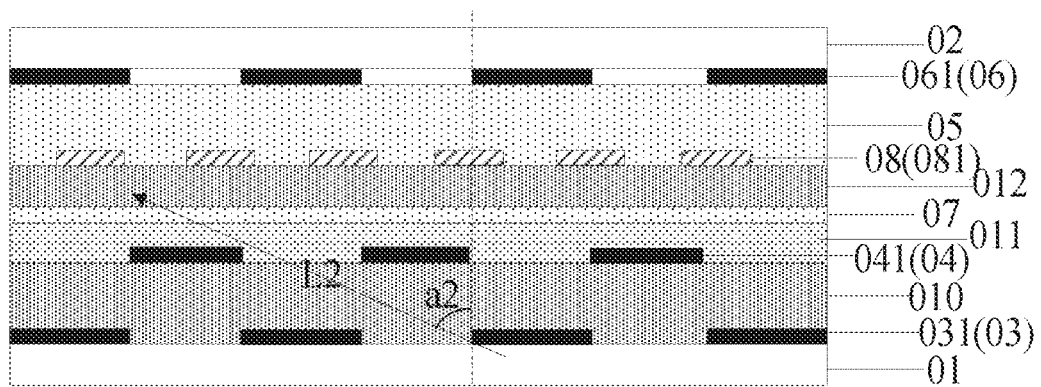
FIG. 5 is a schematic view of a light path of a portion of light incident on the liquid crystal layer when a voltage is applied between a first electrode and a second electrode in the display unit of FIG. 2.

FIG. 5 is a schematic view of a light path of a portion of light incident on the liquid crystal layer when a voltage is applied between the first electrode and the second electrode in FIG. 2. The voltage is applied between the first electrode 07 and the second electrode 08 to generate an electric field, as shown in FIG. 5. Among the light which is incident from the side of the first substrate away from the second substrate and passes through the first interval and the second interval and then reaches the liquid crystal, Light L2 has the largest incident angle a2. That is, the light with an incident angle between 0 and a2 may pass through the first intervals between the first light-shielding strips 031 and the second intervals between the second light-shielding strips 041 and reach the liquid crystal layer 05. Under the action of the electric field, the liquid crystal layer 05 is equivalent to the grating having the periodic arch structure, as shown in FIG. 4. In this case, among the light incident on the liquid crystal layer 05, polarized light having a polarization direction parallel to the extending direction of the second sub-electrodes is dispersed into light diverging in multiple directions by the equivalent grating. A portion of the light diverging in multiple directions is blocked by the third light-shielding strips 061, the other portion passes through the third intervals between the third light-shielding strips and reaches the second substrate 02. In the light reaching the second substrate 02, if its incident angle is less than the critical angle a, it may penetrate through the second substrate 02, thereby achieving display.

As mentioned above, the degree to which the polarized light having a polarization direction parallel to an extending direction of the second sub-electrodes among the light incident on the liquid crystal layer 05 is dispersed by the equivalent grating is positively related to the voltage applied between the first electrode and the second electrode. The higher the voltage applied between the first electrode and the second electrode is, the greater the degree to which the light is dispersed is, and thereby the greater the intensity of light passing though and exiting from the second substrate is. According to this principle, the intensity of the light passing though and exiting from the second substrate in the display unit may be controlled by controlling the magnitude of the voltage between the first electrode 07 and the second electrode 08, to achieve display of different gray levels. For example, when the voltage is maximum, the intensity of the light passing though and exiting from the second substrate reaches a peak, which corresponds to a gray level of L255, i.e., a full white state.

Therefore, based on the above principle, the third light-shielding strips of the third light-shielding pattern 06 and the third intervals therebetween may be designed according to sizes of different display units, so that in the full black state, the light passing though the liquid crystal layer is blocked by the plurality of third light-shielding strips or totally reflected at the interface between the second substrate and the external environment, and in the full white state, the light exiting from the side of the second substrate facing away from the first substrate is as much as possible.

Therefore, in the embodiment of the present disclosure, the full black state of the display unit is achieved by the shading of the first to third light-shielding patterns and the total reflection generated at the interface between the second substrate made of glass and the external environment such as air. A portion of light incident on the liquid crystal layer may pass through the third intervals between the third light-shielding strips and pass through and exit from the second substrate by the liquid crystal layer equivalent to the grating. The intensity of the light exiting from the second substrate is controlled by the applied voltage so as to achieve display of different gray levels. The display panel with the display unit in this embodiment does not require a polarizer, thereby reducing the cost of the display panel and improving the reliability of the display panel.

Figure 6:
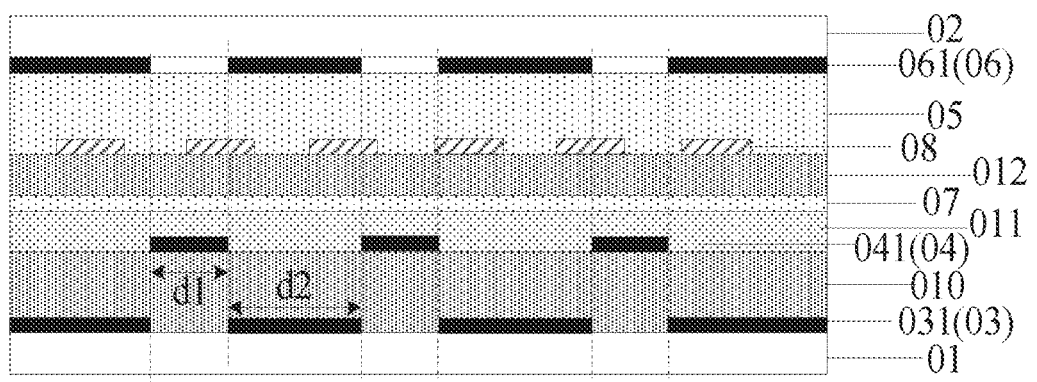
FIG. 6 is a schematic sectional view of a display unit provided by an embodiment of the present disclosure.

In an embodiment, in order to simplify the design of the third light-shielding pattern, the orthogonal projection of the first light-shielding pattern on the first substrate coincides with the orthogonal projection of the third light-shielding pattern on the first substrate. FIG. 6 is a schematic sectional view of a display unit provided by an embodiment of the present disclosure. Referring to FIG. 6, the third light-shielding strips 061 are in one-to-one correspondence with the first light-shielding strips 031, and the third intervals between the third light-shielding strips 061 are in one-to-one correspondence with the first intervals between the first light-shielding strips 031.

Referring to FIG. 6, in order to avoid light leakage in the full black state and increase the brightness in the full white state, in an embodiment of the present disclosure, a width d1 of each second light-shielding strip 041 of the second light-shielding pattern 04 is half of a width d2 of each first light-shielding strip 031 of the first light-shielding pattern 03, and an orthogonal projection of each second light-shielding strip 041 on the first substrate 01 coincides with an orthogonal projection of one first interval between the first light-shielding strips 031 on the first substrate.

It should be noted that a width of light-shielding strip in the embodiment of the present disclosure is a length in the first direction. The width d1 of each second light-shielding strip 041 of the second light-shielding pattern 04 is disposed to be half of the width d2 of each first light-shielding strip 031 of the first light-shielding pattern 03, and the third light-shielding strips 061 are disposed to be in one-to-one correspondence with the first light-shielding strips 031 of the first light-shielding pattern 03, that is, the orthogonal projection of each third light-shielding strip 061 on the first substrate 01 coincides with the orthogonal projection of the corresponding first light-shielding strip 031 on the first substrate 01. In this way, the display unit may achieve display of different gray levels more effectively.

Figure 7:
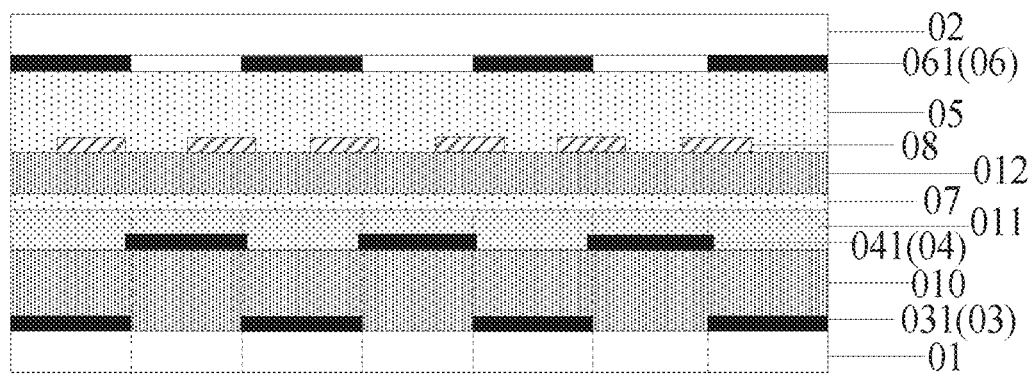
FIG. 7 is a schematic sectional view of a display unit provided by an embodiment of the present disclosure.
Figure 8:
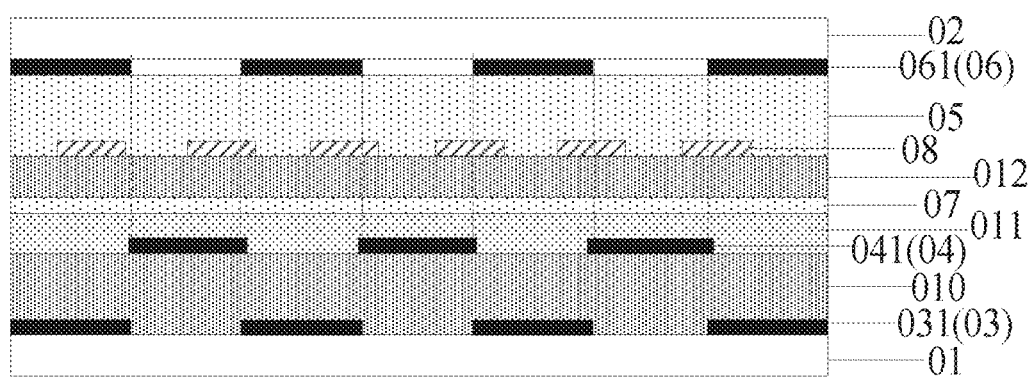
FIG. 8 is a schematic sectional view of a display unit provided by an embodiment of the present disclosure.
Figure 9:
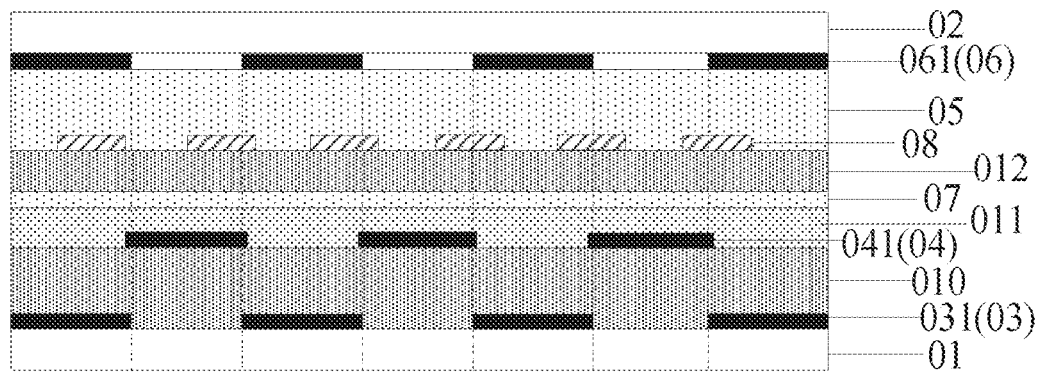
FIG. 9 is a schematic sectional view of a display unit provided by an embodiment of the present disclosure.

In an embodiment, in order to avoid light leakage in the display unit, widths of the first to third light-shielding strips may be adjusted appropriately. For example, FIG. 7 is a schematic sectional view of a display unit provided by an embodiment of the present disclosure. Referring to FIG. 7, an orthogonal projection of each second light-shielding strip 041 on the first substrate overlaps orthogonal projections of two first light-shielding strips 031 adjacent to the second light-shielding strip 041 on the first substrate. For example, FIG. 8 is a schematic sectional view of a display unit provided by an embodiment of the present disclosure. Referring to FIG. 8, an orthogonal projection of each second light-shielding strip 041 on the first substrate overlaps orthogonal projections of two third light-shielding strips 061 adjacent to the second light-shielding strip 041 on the first substrate. For example, FIG. 9 is a schematic sectional view of a display unit provided by an embodiment of the present disclosure. Referring to FIG. 9, an orthogonal projection of each second light-shielding strip 041 on the first substrate overlaps orthogonal projections of two first light-shielding strips 031 adjacent to the second light-shielding strip 041 on the first substrate, and the orthogonal projection of each second light-shielding strip 041 on the first substrate overlaps orthogonal projections of two third light-shielding strips 061 adjacent to the second light-shielding strip 041 on the first substrate.

It should be noted that when orthogonal projections of the second light-shielding strips on the first substrate overlap orthogonal projections of the first light-shielding strips or the third light-shielding strips on the first substrate, the transmittance of the display unit may be decreased. Therefore, when orthogonal projections of the second light-shielding strips on the first substrate overlap orthogonal projections of the first light-shielding strips or the third light-shielding strips on the first substrate, the overlapping regions need to be set as small as possible. For example, a left edge of each second light-shielding strip is disposed to be slightly overlapped with a right edge of one first light-shielding strip which is adjacent to the second light-shielding strip and on the left of the second light-shielding strip, and a right edge of each second light-shielding strip is disposed to be slightly overlapped with a left edge of one first light-shielding strip which is adjacent to the second light-shielding strip and on the right of the second light-shielding strip. Thus the overlapped regions of the orthogonal projections of the second light-shielding strips on the first substrate and the orthogonal projections of the first light-shielding strips on the first substrate are small. Similarly, a left edge of each second light-shielding strip is disposed to be slightly overlapped with a right edge of one third light-shielding strip which is adjacent to the second light-shielding strip and on the left of the second light-shielding strip, and a right edge of each second light-shielding strip is disposed to be slightly overlapped with a left edge of one third light-shielding strip which is adjacent to the second light-shielding strip and on the right of the second light-shielding strip. Thus the overlapped regions of the orthogonal projections of the second light-shielding strips on the first substrate and the orthogonal projections of the third light-shielding strips on the first substrate are small.

Figure 10:
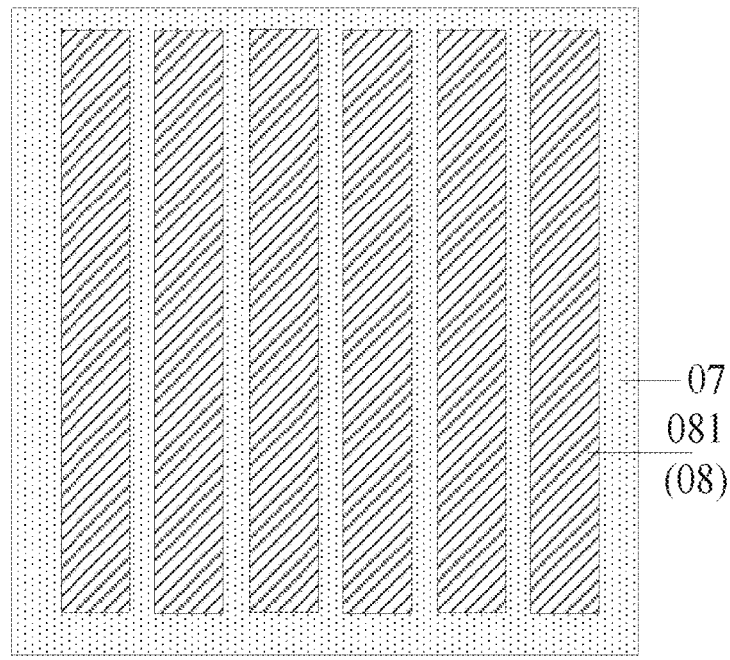
FIG. 10 is a schematic top view of a first electrode and a second electrode of the display unit in FIG. 2.

In an embodiment, the liquid crystal layer located between the second light-shielding pattern and the third light-shielding pattern in the display unit may be driven by an arched electric field. Referring to FIG. 2, the first electrode 07 is a planar electrode and the second electrode 08 includes a plurality of strip electrodes. The second electrode 08 is closer to the liquid crystal layer 05 than the first electrode 07. A voltage is applied between the first electrode and the second electrode to form an arched electric field having an intensity distribution. FIG. 10 is a schematic top view of the first electrode and the second electrode of the display unit in FIG. 2. Referring to FIGS. 2 and 10, the first electrode 07 is the planar electrode extending throughout the whole display unit, and the second electrode 08 includes a plurality of strip-like second sub-electrodes 081 evenly spaced apart in the first direction. The first electrode and the second electrode may be made of a transparent conductive material, such as indium tin oxide, etc.

It should be noted that, generally, the display unit further includes a common electrode and a pixel electrode. The common electrode in the display unit acts as the first electrode in the embodiment of the present disclosure. The pixel electrode in the display unit acts as the second electrode in the embodiment of the present disclosure. A voltage is applied between the pixel electrode and the common electrode to drive liquid crystal molecules in the liquid crystal layer, so that the liquid crystal layer may serve as a grating.

Figure 11:
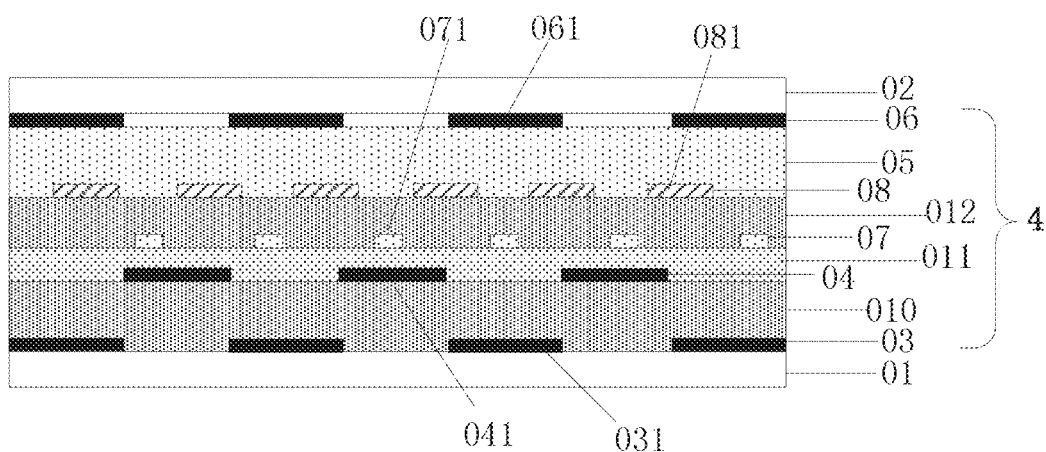
FIG. 11 is a schematic sectional view of a display unit provided by an alternative embodiment of the present disclosure.

In an alternative embodiment, the first electrode 07 may include a plurality of strip-like sub-electrodes instead of the planar electrode. FIG. 11 is a schematic sectional view of a display unit provided by an alternative embodiment of the present disclosure. As shown in FIG. 11, the first electrode 07 may also include a plurality of strip-like first sub-electrodes 071 evenly spaced apart in the first direction, orthogonal projections of the plurality of first sub-electrodes 071 on the first substrate and orthogonal projections of the plurality of second sub-electrodes 081 on the first substrate are alternately arranged one by one. In this case, when a voltage is applied between the first electrode 07 and the second electrode 08, the liquid crystal layer 05 may also be equivalent to the grating structure in FIG. 4, and the gray level display of L0-L255 can also be realized.

Figure 12:
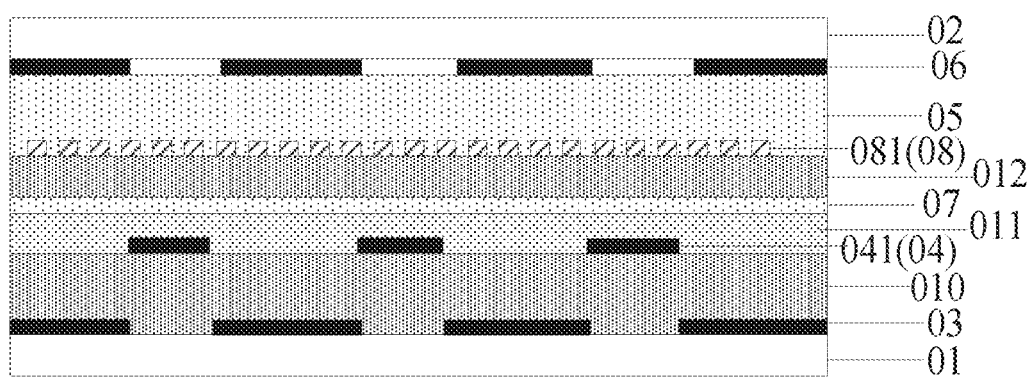
FIG. 12 is a schematic sectional view of a display unit provided by an embodiment of the present disclosure.

Specifically, in the display unit provided by the above embodiments of the present disclosure, in order to ensure normal display of the display unit, a pitch of the plurality of spaced apart second sub-electrodes 081 is set to approximately 3 μm to 10 μm, the duty cycle of the second electrode may be approximately 40%-60%. In this case, when the voltage is applied between the first electrode 07 and the second electrode 08, the liquid crystal layer is equivalent to a grating with a periodic arch structure, and the pitch of the grating is half of the pitch of the second sub-electrodes, and is about 1.5 μm-5 μm. In this case, the equivalent grating formed by the liquid crystal layer may better disperse the light incident on the liquid crystal layer. Further, each of the second intervals between the second light-shielding strips may correspond to a plurality of equivalent grating pitches. FIG. 12 is a schematic sectional view of a display unit provided by an embodiment of the present disclosure. Referring to FIG. 12, each of the second intervals between the second light-shielding strips 041 corresponds to at least three second sub-electrodes 081 so that each of the second intervals between the second light-shielding strips 041 corresponds to a plurality of equivalent grating pitches. Specifically, in the above display unit provided by the embodiment of the present disclosure, the width of each second interval between the second light-shielding strips 041 is approximately 20 μm-30 μm. In this case, more light may irradiate onto the equivalent grating formed by the liquid crystal layer at various incident angles, so that the fan-like light beam emitted from the equivalent grating formed by the liquid crystal layer has a larger fan angle and stronger light intensity.

Figure 13:
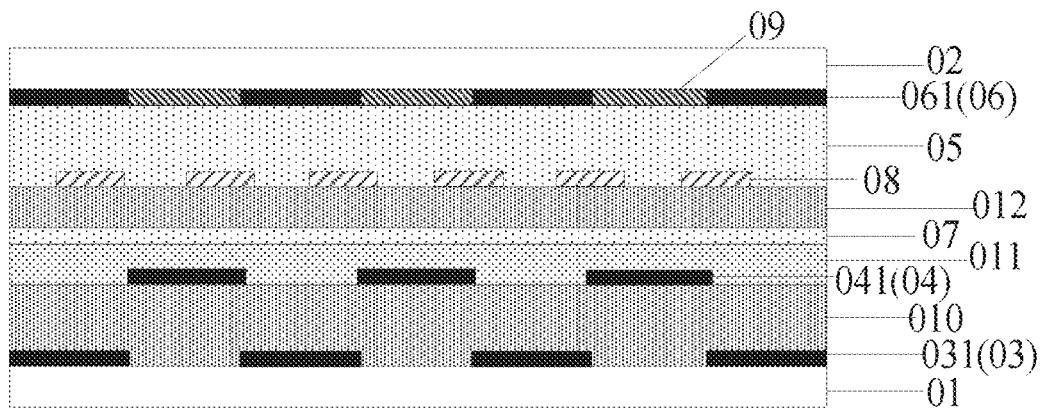
FIG. 13 is a schematic sectional view of a display unit provided by an embodiment of the present disclosure.

In a display unit provided by an embodiment of the present disclosure, FIG. 13 shows a schematic sectional view of a display unit provided by an embodiment of the present disclosure. Referring to FIG. 13, the display unit further includes a plurality of monochromatic filters 09, each monochromatic filter 09 is disposed in the same layer as the third light-shielding pattern 06 and fills one third interval between two adjacent third light-shielding strips 061 of the third light-shielding pattern 06. Specifically, light emitted from a backlight source and irradiating onto a display panel having a plurality of display units is white light generally. The white light may enter and pass though the liquid crystal layer of the display unit of the display panel, then pass though each monochromatic filter filling one third interval between any two adjacent third light-shielding strips 061 to become monochromatic light. The monochromatic filters of the display unit may be red, green, or blue, etc., thus a display panel with display units arranged in an array may realize color display.

In summary, in the embodiments of the present disclosure, a structure where the first to third light-shielding patterns are sequentially stacked and the liquid crystal layer which may be equivalent to a grating with a periodic arch structure to disperse the incident light are used to achieve display of different gray levels.

Figure 14:
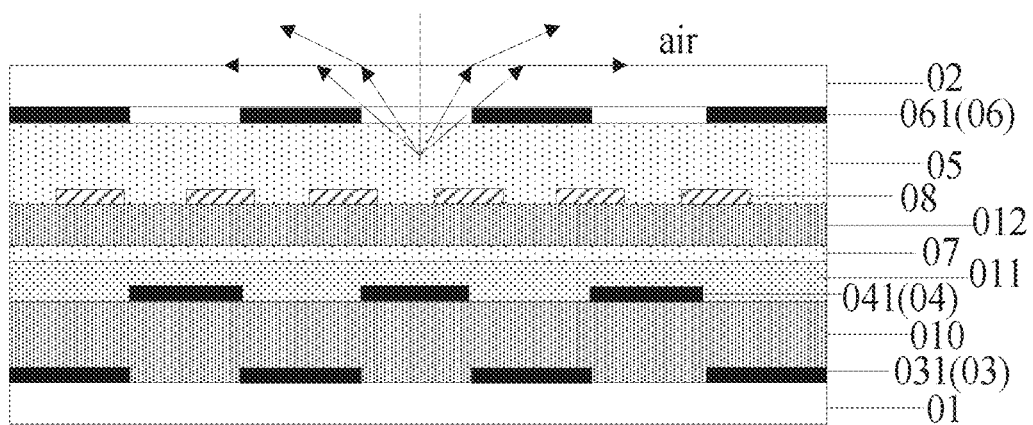
FIG. 14 is a schematic view of a light path of light emitted from a display unit provided by an embodiment of the present disclosure.

FIG. 14 is a schematic view of a light path of light emitted from a display unit provided by an embodiment of the present disclosure. The dispersed light passes through a third interval between two adjacent third light-shielding strips, then passes through a second substrate 02 made of glass and enters the external environment, such as air. Light with an incident angle less than a critical angle may be refracted at an interface between the glass and the air, and light with an incident angle closed to the critical angle is refracted at an exit angle of approximately 90°, as shown in FIG. 14. Therefore, the display panel having the display units in the embodiment of the present disclosure may realize a wide viewing angle range without using a diffusion device. In addition, the display panel does not need to be provided with a polarizer, which saves the cost of the display panel.

In the above embodiments of the present disclosure, the cross-sectional structure of the display unit is taken in the first direction in FIG. 1. In other alternative embodiments, the cross-sectional structure of the display unit taken in a second direction perpendicular to the first direction may be similar to the cross-sectional structure taken in the first direction.

Figure 15:
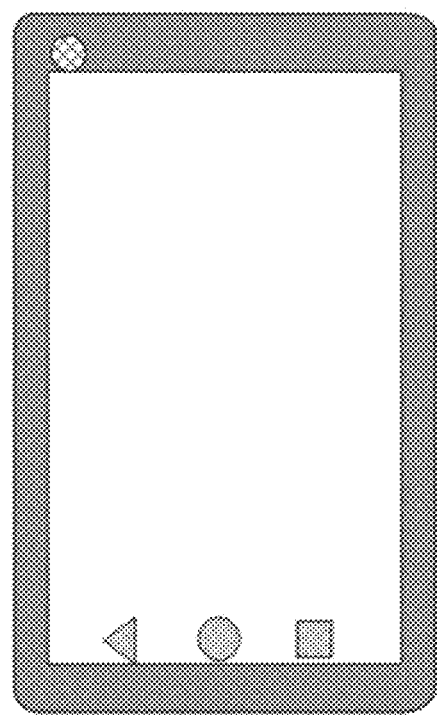
FIG. 15 is a schematic structural view of a display device according to an embodiment of the present disclosure.

An embodiment of the present disclosure further provides a display device including a display panel having any one of the above-mentioned display units provided by the embodiments of the present disclosure, and a light source that emits light incident on the display panel. The display device may be any product or component having a display function such as a mobile phone (as shown in FIG. 15), a tablet computer, a television, a display, a notebook computer, a digital photo frame, a navigator, and the like. Embodiments of the display device may refer to the above embodiments of the display panel, and repeated description is omitted.

In summary, the display panel provided by the embodiments of the present disclosure includes the first substrate and the second substrate aligned and assembled with each other. The first light-shielding pattern, the second light-shielding pattern, the liquid crystal layer and the third light-shielding pattern are sequentially disposed on the side of the first substrate facing the second substrate. Each of the light-shielding patterns includes a plurality of light-shielding strips spaced apart. The orthogonal projection of each second interval between the second light-shielding strips of the second light-shielding pattern on the first substrate falls within the orthogonal projection of one first light-shielding strip of the first light-shielding pattern on the first substrate. The first electrode and the second electrode are disposed between the liquid crystal layer and the second light-shielding pattern. When the voltage is applied between the first electrode and the second electrode to generate the electric field, the liquid crystal layer is equivalent to a grating having a periodic arch structure, then the light incident on the liquid crystal layer may be dispersed by the grating, and the dispersed light may pass through the third intervals between the third light-shielding strips and exit from the second substrate. When no voltage is applied between the first electrode and the second electrode, the light incident on the liquid crystal layer may be blocked or absorbed by the third light-shielding strips of the third light-shielding pattern or totally reflected back to the display panel at the interface between the second substrate and the external environment. Therefore, in the embodiments of the present disclosure, the full black state of the display unit is achieved by the shading or absorption of the first to third light-shielding patterns and the total reflection generated at the interface between the second substrate made of glass and the external environment such as air. A portion of light incident on the liquid crystal layer may be dispersed and pass through the third intervals between the third light-shielding strips of the third light-shielding pattern and pass through and exit from the second substrate by the liquid crystal layer equivalent to the grating. The intensity of the light exiting from the second substrate is controlled by the applied voltage so as to achieve display of different gray levels. The display panel does not require a polarizer, thereby reducing the cost of the display panel and improving the reliability of the display panel.

It will be apparent to those skilled in the art that various modifications and variations can be made in the present disclosure without departing from the spirit and scope of the disclosure. Thus, if these modifications and variations of the present disclosure fall within the scope of the claims of the present disclosure and their equivalent technologies, the present disclosure also intends to include these modifications and variations.

What is claimed is:

1. A display panel, comprising:
   a first substrate;
   a second substrate opposite to the first substrate; and
   a liquid crystal layer between the first substrate and the second substrate,
   wherein the display panel has a plurality of display units arranged in an array, at least one display unit comprises:
   a first light-shielding pattern between the first substrate and the liquid crystal layer;
   a second light-shielding pattern between the first light-shielding pattern and the liquid crystal layer;
   a third light-shielding pattern between the liquid crystal layer and the second substrate; and
   a first electrode and a second electrode between the second light-shielding pattern and the liquid crystal layer,
   wherein the first to third light-shielding patterns are configured such that light incident on the liquid crystal layer from a side of the first substrate away from the second substrate is prevented from exiting from a side of the second substrate away from the first substrate in response to an absence of voltage between the first electrode and the second electrode; and
   wherein the first electrode, the second electrode and the liquid crystal layer are configured such that the liquid crystal layer serves as an equivalent grating, and a portion of the light incident on the liquid crystal layer from the side of the first substrate away from the second substrate is directed to exit from the side of the second substrate away from the first substrate in response to the voltage between the first electrode and the second electrode,
   wherein the first light-shielding pattern comprises a plurality of first light-shielding strips evenly spaced apart in a first direction, the second light-shielding pattern comprises a plurality of second light-shielding strips evenly spaced apart in the first direction, the third light-shielding pattern comprises a plurality of third light-shielding strips evenly spaced apart in the first direction,
   wherein the second electrode comprises a plurality of second sub-electrodes evenly spaced apart in the first direction, orthogonal projections of at least three second sub-electrodes on the first substrate fall within an orthogonal projection of a second interval between each two adjacent second light-shielding strips on the first substrate.

2. The display panel according to claim 1, wherein the orthogonal projection of the second interval between each two adjacent second light-shielding strips on the first substrate falls within an orthogonal projection of one of the plurality of first light-shielding strips on the first substrate.

3. The display panel according to claim 2, wherein a portion of the light incident from the side of the first substrate away from the second substrate passes through first intervals between two adjacent first light-shielding strips and second intervals between two adjacent second light-shielding strips and reaches the liquid crystal layer,
   wherein the first to third light-shielding patterns are configured such that the liquid crystal layer servers as an equivalent dielectric layer, and the light reaching and passing through the liquid crystal layer is blocked by the plurality of third light-shielding strips or totally reflected at an interface between the second substrate and an external environment after passing through third intervals between two adjacent third light-shielding strips, in response to the absence of voltage between the first electrode and the second electrode; and
   wherein the first electrode, the second electrode and the liquid crystal layer are configured such that the liquid crystal layer serves as an equivalent grating, and the light incident on the liquid crystal layer with a polarization direction parallel to the first direction is dispersed into a fan-like light beam after passing through the liquid crystal layer, in response to the voltage between the first electrode and the second electrode, and a portion of the fan-like light beam is directed to pass through the third intervals between the two adjacent third light-shielding strips and emitted from the second substrate, and an intensity of the light emitted from the second substrate is positively correlated to a magnitude of the voltage.

4. The display panel according to claim 3, wherein orthogonal projections of the plurality of first light-shielding strips on the first substrate are coincident with orthogonal projections of the plurality of third light-shielding strips on the first substrate, respectively.

5. The display panel according to claim 3, wherein a width of each of the second light-shielding strips is approximately a half of a width of each of the first light-shielding strips.

6. The display panel according to claim 3, wherein an orthogonal projection of at least one of the second light-shielding strips on the first substrate and an orthogonal projection of at least one of the first light-shielding strips adjacent to the at least one of the second light-shielding strips on the first substrate have an overlapping region.

7. The display panel according to claim 3, wherein an orthogonal projection of at least one of the second light-shielding strips on the first substrate and an orthogonal projection of at least one of the third light-shielding strips adjacent to the at least one of the second light-shielding strips on the first substrate have an overlapping region.

8. The display panel according to claim 3, wherein the second electrode is between the first electrode and the liquid crystal layer.

9. The display panel according to claim 8, wherein the second electrode is periodic with a pitch of approximately 3 µm-10 µm.

10. The display panel according to claim 9, wherein a width of the second interval between each two adjacent second light-shielding strips is approximately 20 µM to 30 µm.

11. The display panel according to claim 8, wherein the first electrode is a planar electrode.

12. The display panel according to claim 8, wherein the first electrode comprises a plurality of first sub-electrodes evenly spaced apart in the first direction, orthogonal projections of the plurality of first sub-electrodes on the first substrate and orthogonal projections of the plurality of second sub-electrodes on the first substrate are alternately arranged one by one.

13. The display panel according to claim 8, wherein the grating is of a periodic arch structure.

14. The display panel according to claim 13, wherein a pitch of the grating is half of a pitch of the second electrode.

15. The display panel according to claim 8, further comprising:
   a resin layer between the first light-shielding pattern and the second light-shielding pattern;
   a planarization layer between the second light-shielding pattern and the first electrode; and
   an insulating layer between the first electrode and the second electrode.

16. The display panel according to claim 1, further comprising:
   a plurality of color filter layers respectively disposed between each two adjacent third light-shielding strips and disposed in a same layer as the third light-shielding strips.

17. A display device comprising:
   the display panel according to claim 1; and
   a backlight source facing the first substrate.

* * * * *